Dec. 24, 1935.  E. ZAHM ET AL  2,025,142
COOLING MEANS FOR GAS COMPRESSORS
Filed Aug. 13, 1934  3 Sheets-Sheet 1
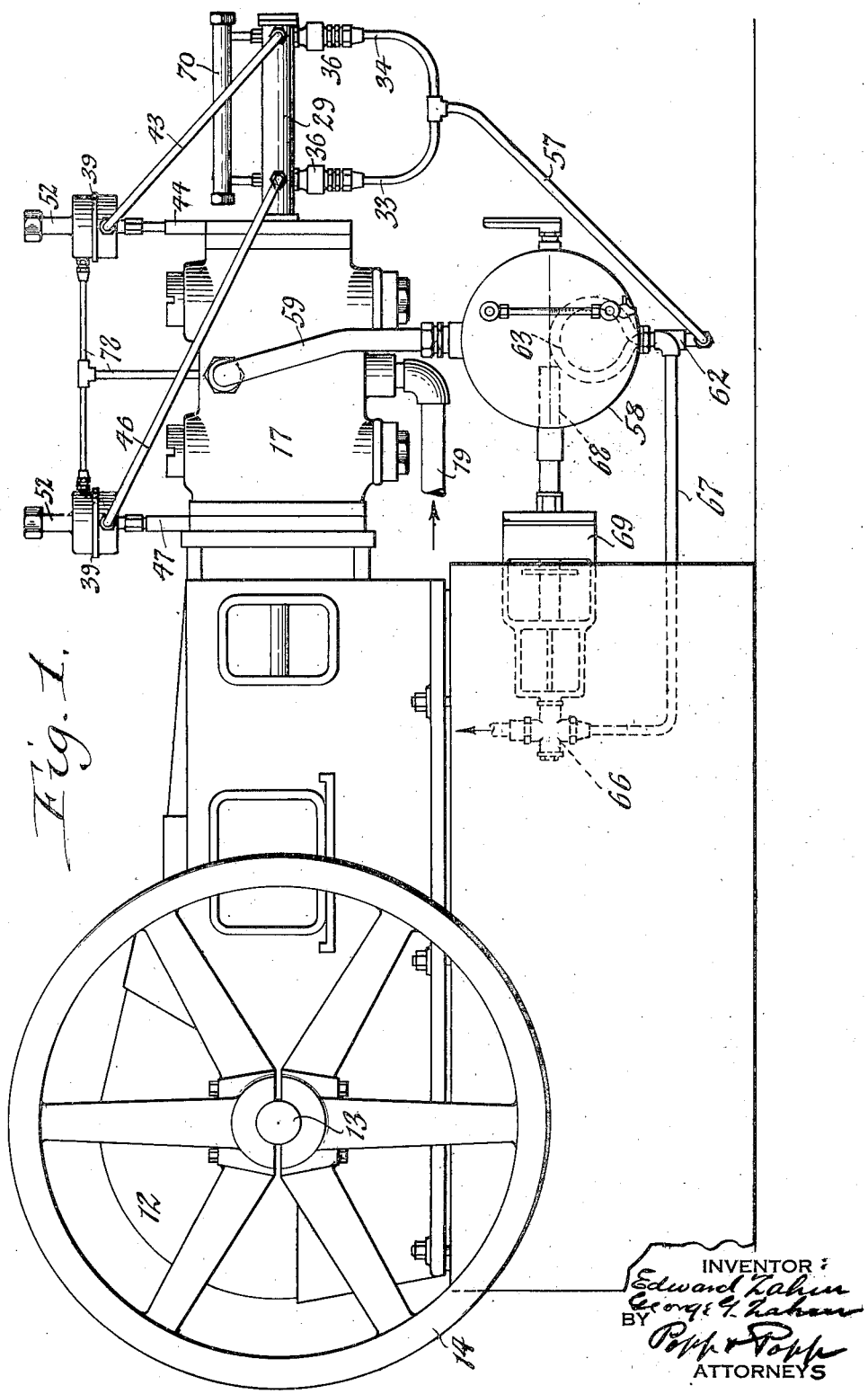

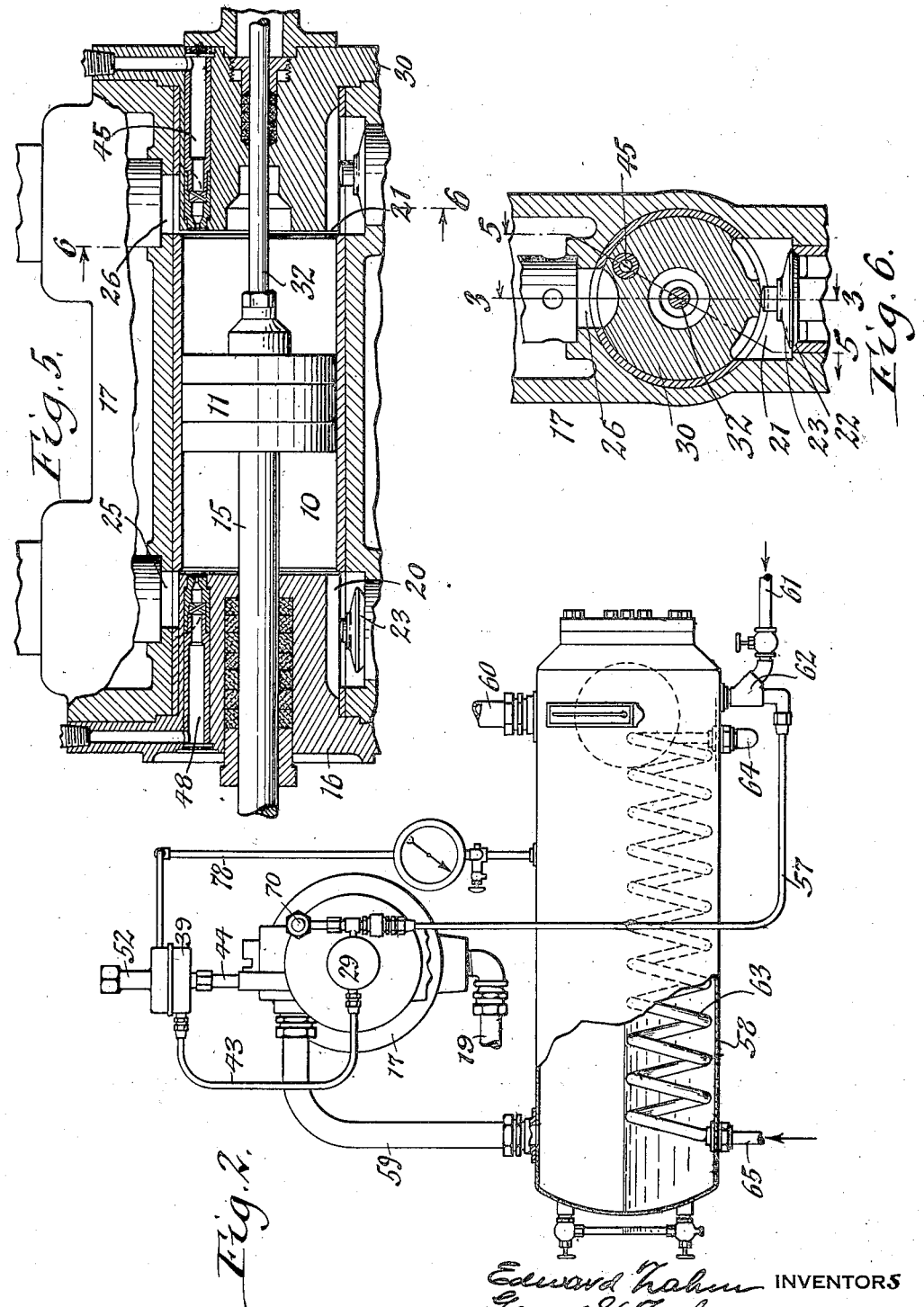

Dec. 24, 1935.  E. ZAHM ET AL  2,025,142
COOLING MEANS FOR GAS COMPRESSORS
Filed Aug. 13, 1934  3 Sheets-Sheet 3
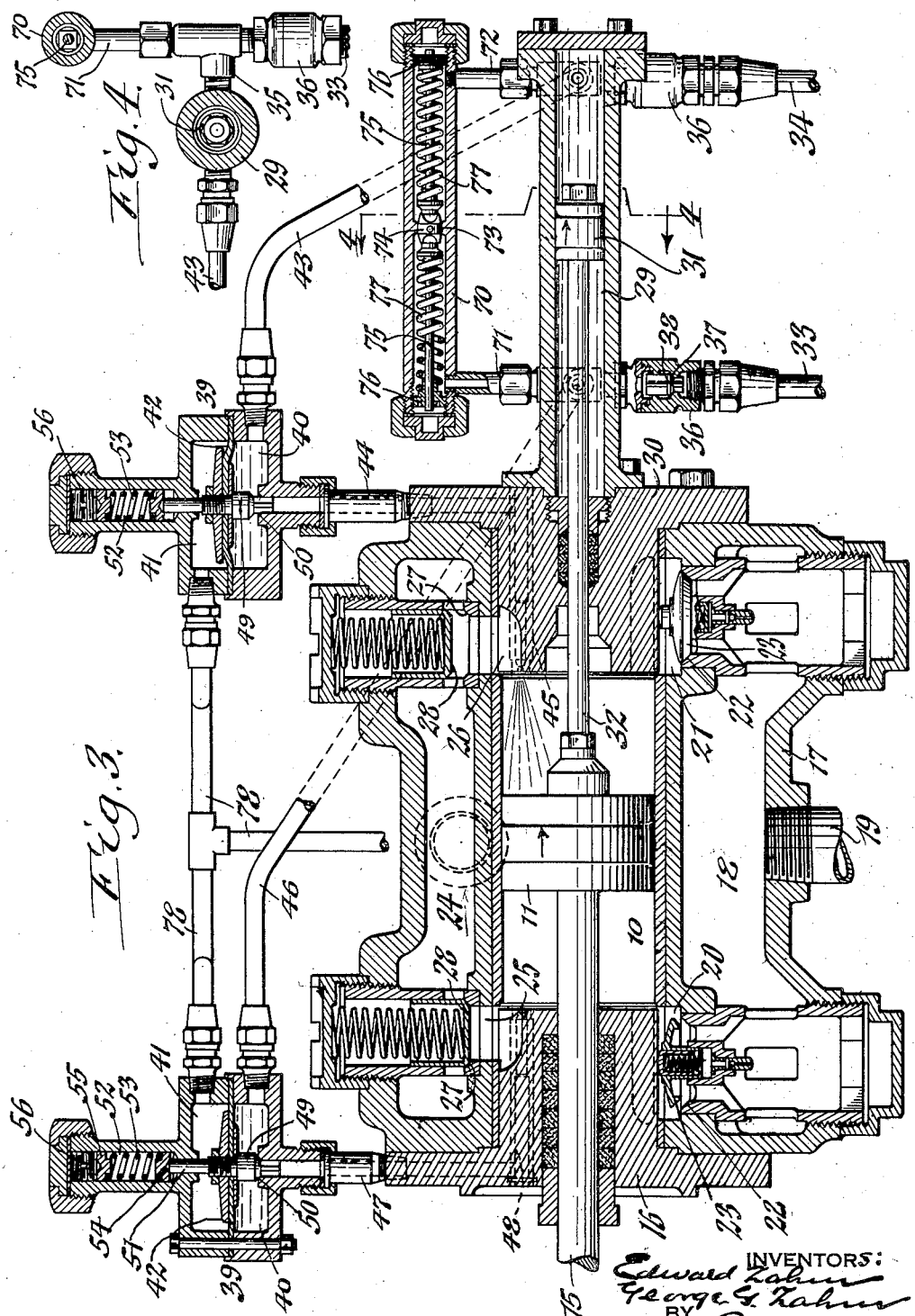

Patented Dec. 24, 1935

2,025,142

UNITED STATES PATENT OFFICE 2,025,142

COOLING MEANS FOR GAS COMPRESSORS

Edward Zahm, Buffalo, and George G. Zahm, Kenmore, N. Y., assignors to Zahm & Nagel Co. Inc., Buffalo, N. Y., a corporation of New York Application August 13, 1934, Serial No. 739,552

21 Claims. (Cl. 230—208)

This invention relates to a gas compressing apparatus and more particularly to an apparatus for compressing gases which are derived from beer during the process of fermentation and which are subsequently re-introduced into the beer for the purpose of rendering the same palatable.

In the manufacture of beer, as now commonly practised, the so-called carbonating process is used by means of which the beer is saturated under pressure with carbonic acid gas, which gas is usually previously collected from the beer during the process of fermentation of the same. This gas, when taken from the beer during the process of fermentation, possesses flavors which are desirable in the finished product, but subjecting the gas to heat as is done in the ordinary method of compression for the purpose of enabling the same to be stored more compactly, causes the delicacy of these flavors to be impaired and thereby objectionably affect the beer into which the same are subsequently re-introduced.

The gases obtained during the process of fermenting beer are subjected to a very high pressure, usually about 250 pounds in order that a large quantity of the same may be stored compactly in tanks provided for that purpose, and the method and apparatus heretofore employed for this purpose has affected the delicacy of its flavor due to heating of the same.

It is the object of this invention to provide a gas compressing apparatus whereby the gas may be compressed without causing the same to be heated and thereby enable the same to be stored with no appreciable loss in the delicacy of its flavor.

With this end in view this invention consists generally in providing an apparatus which subjects the gas throughout the compression stage to a spray of cold water, so that the latter abstracts from the gas the heat which is produced during the compressing operation, and this water is separated from the gas and re-cooled preparatory to being used again, while the compressed gas is stored in the tanks installed for that purpose.

Obviously the water which is thus re-used becomes saturated with carbonic acid gas and the quantity and solution increase with the pressure, and in order to increase the efficiency of the compressing apparatus the injection of water into the gas takes place only during the compression stroke of the compressor, and the injection of water in the compressor is cut off during the suction stroke of the same, inasmuch as an injection of water into the compressor during the suction stroke of the piston in the compressor would liberate gas and thus require greater displacement in the cylinder of the compressor.

In the accompanying drawings:

Figure 1 is a side elevation of a gas compressing apparatus embodying our improvements.

Figure 2 is a fragmentary front elevation of the same, showing parts broken away for the purpose of disclosing some of the internal construction of the mechanism.

Figure 3 is a vertical longitudinal section of the gas compressor and water injecting pump and associated parts, on an enlarged scale, the section of the compressor cylinder and adjacent parts being taken on line 3—3 Fig. 6.

Figure 4 is a vertical transverse section, taken on line 4—4 Fig 3.

Figure 5 is a fragmentary, vertical, longitudinal section, similar to Fig. 3, but taken on line 5—5 Fig. 6.

Figure 6 is a vertical transverse section, taken on the correspondingly numbered line in Fig. 5.

In the following description similar characters of reference indicate like parts in the several figures of the drawings.

In its general organization this gas compressing apparatus comprises a compressor for compressing the gas, a water pump for supplying water to the compressor, a control valve mechanism whereby the water from the pump is admitted to the compressor only during the compression stroke of the compressor piston, a separating tank, chamber or receiver from which water is supplied to the pump for cooling purposes and heated water is returned from the compressor and separated therefrom preparatory to being again cooled and returned to the pump, means for relieving excess pressure in the pump and preventing injury in the event of clogging of any of the passages through which the water is delivered from the pump, and means for automatically maintaining the cooling water at a predetermined temperature.

Although the gas compressor may be variously constructed, the form which is shown in the drawings has been found satisfactory in practice and as there shown the same is organized as follows:

The numeral 10 represents the compressor cylinder in which a piston 11 is reciprocated lengthwise by means of a motor of any suitable construction, such for example as an electric motor which is generally indicated by the numeral 12, and provided with a driving shaft 13 having a fly wheel 14, and operatively connected with the piston rod 15 of the piston which extends through a stuffing box in the front head 16 of the compressor cylinder, as shown in Figs. 3 and 5.

The body 17 of the compressor in which the cylinder 10 is formed has its lower part constructed to form a gas inlet chamber 18 to which the gas to be compressed is supplied through a pipe 19 from any suitable source, such for example as the tanks in which the beer is fermented. The opposite ends of this gas inlet chamber are connected with the opposite ends of the compressor cylinder by means of gas inlet passages or inlets 20, 21, each of which contains an inwardlly opening check valve which permits gas to be sucked from the inlet chamber 18 into the respective end of the compressor cylinder as the piston moves away from this end of the cylinder, but when the piston moves toward the same the disk of this check valve closes so as to prevent the return of gas from the cylinder into the inlet chamber.

Inasmuch as this check valve can be of any suitable and well-known construction the form in the drawings may be regarded as merely one suitable for this purpose, and as there shown the same consists of a valve seat 22 surrounding a port forming part of the respective gas inlet and a valve closure 23 movable toward and from this seat for opening and closing this port.

In the upper part of the compressor body the same is provided with an outlet chamber 24 for gas and water discharged from the compressor cylinder, which outlet chamber is connected at its opposite ends with the opposite ends of the compressor cylinder by means of outlets or outlet passages 25, 26. Each of these outlets is provided with an outwardly opening check valve whereby the water and compressed gas are permitted to escape from the respective end of the compressor cylinder during the compression stroke of the compressor piston toward the respective end of this cylinder, but during the suction stroke of this piston from the respective end of this cylinder, this check valve is closed so as to prevent the backward flow of any gas and water from the outlet chamber 26 into the compressor cylinder.

Each of these outlet check valves may also be of any suitable or conventional construction and it is therefore deemed sufficient to indicate that this valve is provided with a seat 27 surrounding the port which forms part of the respective gas and water outlets and a closure 28 which is movable toward and from the seat 27, as shown in Fig. 3.

Means are provided for introducing cooling water, preferably in the form of a spray, into each end of the compressor cylinder during the time that the piston is moving toward the respective end of the compressor cylinder and effecting a compression stroke upon the gas therein for the purpose of cooling the gas during such compression, which mechanism is, however, so constructed that the supply of water to each end of the compressor cylinder is cut off, while the compressor piston is moving away from the respective end of the cylinder and effecting its suction stroke for drawing uncompressed gas into this cylinder.

These water supplying means may be variously organized but the form which is shown in the drawings has been found satisfactory in practice and is constructed as follows:

The numeral 29 represents a pump cylinder or barrel which is arranged horizontally and has its inner end preferably mounted on the rear head 30 of the compressor cylinder. In this pump cylinder a pump plunger or piston 31 reciprocates for the purpose of alternately drawing water into opposite ends of the pump cylinder and discharging the same therefrom. This pump plunger is actuated in unison with the compressor piston, and this is preferably accomplished by arranging the compressor cylinder and pump cylinder axially in line and providing a connecting rod 32 which connects the compressor piston 11 with the pump plunger 31, and extends through a suitable stuffing box in the rear head of the compressor cylinder, as best shown in Fig. 3.

Water is supplied to opposite ends of the pump cylinder by means of branch pipes 33, 34 connected by means of fittings 35 with the respective ends of the pump cylinder. These pipes contain inwardly opening check valves 36 of any suitable construction for the purpose of admitting water into the respective ends of the cylinders when the piston moves away from one or the other, but prevents the return flow of water through these pipes when the pistons move toward the ends of the cylinders, each of these valves consisting generally of a casing having a valve seat 37 and a closure member 38 movable toward and from this seat, as shown in Fig. 3.

Adjacent to each head of the compressor cylinder is arranged a valve casing 39, the lower part of which contains a water controlling chamber 40, and the upper part or section of this casing contains a pressure balancing chamber 41. Between the sections of this casing is arranged a flexible diaphragm 42 which forms a movable partition or member between the water controlling chamber 40 and the pressure balancing chamber 41. The water controlling chamber of one of these valve casings 39 is connected by a pipe or conduit 43 with one end of the pump cylinder 29 and it is also connected by a pipe 44 with a water delivery nozzle or inlet 45 which leads to the corresponding end of the compressor cylinder and is preferably arranged in the respective head thereof.

The water controlling chamber 40 of the other valve casing 39 is connected by a pipe 46 with the opposite end of the pump cylinder and is also connected by a pipe 47 with a water inlet or spray nozzle 48 leading to the opposite end of the compressor cylinder, and is preferably arranged in the respective head thereof, as best shown in Fig. 3.

The passage of water from each of the water control chambers 40 to the respective end of the compressor cylinder is controlled by a controlling valve which is actuated by the diaphragm 42 between the respective water controlling chamber and pressure balancing chamber. As shown in Fig. 3, each of these controlling valves comprises a valve closure 49 mounted on the underside of the respective diaphragm 42 and is movable toward and from a valve seat 50 formed around a port in the respective pipe which connects this water controlling chamber with the corresponding end of the compressor cylinder.

Each controlling valve 50 is yieldingly held in its closed position by means of a valve stem 51 projecting upwardly from the diaphragm through the top of the respective controlling valve casing and into a pocket 52, and a spring 53 arranged in said pocket and bearing at its lower end against the upper end of the stem 51 through the medium of a disk 54, while its upper end bears, through the medium of a disk 55, against a screw plug 56 which threadingly engages the upper part of the pocket 52 and permits the tension of the spring 53 to be adjusted to suit different requirements.

As the pump plunger moves toward one end of the pump cylinder the water which is displaced therefrom is discharged into the corresponding water-control chamber 40 and raises the diaphragm associated therewith, together with the control valve 49 carried thereby, so that communication is established between the respective water control chamber 40 and the corresponding end of the compressor cylinder, and water is delivered in the form of a spray or atomized form into the respective end of the compressor cylinder during the compression stroke of the compressor piston, whereby the gas which is being compressed at this time is cooled by the incoming water.

During the movement of the pump plunger away from the end of the cylinder, the respective water-controlling valve 49 is again closed by the combined action of gravity, the suction of the pump plunger, and the respective spring 53, so that no water or gas is drawn backwardly through the respective water control chamber 40 and the piping connected therewith, but instead water is supplied to the respective end of the pump cylinder through the corresponding water supply pipe.

The water may be supplied to this pump from any suitable source, but it is preferably supplied in such manner that the same water can be used repeatedly upon cooling the same preparatory to recirculating it in the apparatus, and thus secure a substantial water economy in the operation of this apparatus.

For this purpose this water is withdrawn by a pipe 57 from the lower part or bottom of a tank or chamber 58, while the opposite end of this pipe connects with the branch pipes 33, 34, as shown in Fig. 1. The lower part of the tank 58 is adapted to hold a quantity of water which is to be delivered by the pump to opposite ends of the compressor cylinder while the upper part of this tank is connected by a pipe 59 with the gas and water outlet chamber 24 of the compressor, so that the compressed gas and the water mixed therewith are forced by the reciprocating piston 11 of the compressor into the upper part of the tank, chamber or receiver 58.

In the latter the compressed gas and water separate from each other, the water dropping into the lower part of the tank, while the freed gas passes lengthwise through the upper part of the tank 58 and is discharged therefrom through a pipe 60 to the storage tanks which are provided to receive the same preparatory to being used.

New cooling water is supplied to the apparatus from time to time as required through a supply pipe 61 which preferably is connected with the lower part of the tank 58 by means of the same fitting 62, which fitting also preferably contains a screen so as to eliminate from the water any solid impurities which it contains before the water is circulated in the compressing apparatus.

In order to cool the water after the same has been heated by the gas during the compressing operation and before again using this water for cooling purposes, cooling means are provided which may be of any suitable construction. As shown in Figs. 1 and 2 these cooling means include a coil 63 which is arranged in the lower part of the tank 58 and has its opposite ends connected with an inlet 64 through which a refrigerant, such as cold brine or cold water, is introduced into the coil, and an outlet 65 through which refrigerant upon discharging from the coil, is returned to the place where the heat is abstracted therefrom preparatory to being circulated.

For the purpose of maintaining the cooling water in the tank 58 at the desired temperature, thermostatic control means are provided whereby a flow of cold brine or other refrigerant through the coil 63 is automatically regulated to suit requirements. Various means may be provided for this purpose, for instance a valve 66 arranged in the pipe 67 which connects with the outlet 65 of the cooling coil 63, thermostatic elements 68 arranged within the water of the tank 58 and an actuating mechanism 69, which is responsive to the thermostatic elements 68 in the tank 58 and operates the valve 66 so as to close the same when the temperature in the tank 58 is normal, and open the valve when the temperature in the tank 58 drops below normal, and thereby permit refrigerant to pass through the coil 63 until the proper reduction in temperature has been obtained, after which the valve 66 is again closed.

It will thus be apparent that the tank 58 serves as a separator in which the compressed gas and water are received from the compressor and separated from each other preparatory to again using the cooling water and conducting the compressed gas to the place of storage; and this tank 58 also serves to hold a supply of cooling water so that the same can be reduced in temperature by the refrigerating apparatus preparatory to being re-used in the compressor.

In order to prevent injury to the apparatus in the event that the water pressure produced by the reciprocation of the pump plunger is excessive, relief means are provided which permit such excess pressure to pass back and forth from one end of the pump cylinder to the other. The preferred form of these relieving means which are shown in Figs. 1, 2, 3 and 4 is constructed as follows:—

The numeral 70 represents a relief chamber which has its opposite ends connected with opposite ends of the pump cylinder, this being preferably accomplished by means of relief pipes 71, 72 which are connected with the same fittings 35, whereby the water supply pipes 33, 34 are connected with the respective ends of the pump cylinder. Within the central part of this relief chamber the same is provided with a relief port 73 which is controlled by a relief valve 74. Projecting from opposite sides of this relief valve are two tension rods or valve stems 75, which are arranged in the respective ends of the relief chamber, and have their inner ends connected with the relief valve, while the outer end of each of these rods is guided in an abutment 76 of disk form, threadingly engaged with the adjacent part of the relief chamber so as to permit of adjusting this abutment toward and from the valve seat 73. Each of these valve rods or stems is surrounded by a spring 77 which bears at its inner end against the relief valve, while its outer end bears against one of the abutments 76. These springs 77 are so tensioned that under normal conditions the same hold the relief valve 74 in the relief port 73 and thereby prevent the flow of any water therethrough. When, however, an excess pressure of the pump plunger is produced in one direction or the other, this pressure is transmitted from the water in one end of the pump cylinder into the relief chamber against the corresponding side of the relief valve 73, so that the latter is pushed out of the relief port and toward the opposite end of the relief chamber, thereby permitting some of the water under pressure to by-pass around the relief valve to the opposite or suction side of the piston and thus prevent injury to the apparatus.

This relief valve operates in like manner when excess pressure in the pump plunger is produced by moving the latter in the opposite direction, thereby safe-guarding the apparatus against possible injury if at any time undue pressure should be exerted by the action of the pump.

The pressure balancing chambers 41 are connected with the upper part of the separating tank or chamber by piping 78. By this means the upper side of each diaphragm is always under the pressure which exists in the water supply tank 58, and it is therefore necessary for the pressure of the water pump while forcing water into the compressor during compression strokes of the piston thereon to exert the greater pressure against the underside of the diaphragm to open the water control valves 49, before any water can enter the compressor cylinder for cooling the gas which is being compressed.

In addition to balancing the gas pressure against opposite sides of the diaphragm 42 a further resistance to opening of the valves 49 may be produced by adjusting the tension of the springs 53 according to the resistance required to suit different conditions and the particular pressure it is desired to apply to the gas when compressing the same.

It will be noted the suction valves of the compressor cylinder are placed on the bottom of the same and the discharge valves at the top of this cylinder, whereby any clearance between this cylinder and the piston therein when the latter reaches the end of its stroke in either direction will be occupied by water only while the gas will be expelled. If the suction valves were at the top and the discharge valves at the bottom of the compressor cylinder, this would be objectionable because it would permit all the water to escape from this cylinder at the end of each compression stroke and thus leave only gas in the clearance spaces, whereby the efficiency of the compressor would be reduced accordingly.

By injecting water into the compressor only during the entire compression strokes of the piston a uniform spray of water is obtained which produces a thorough mixing of the gas with water so as to effectively cool the gas which tends to heat upon being compressed, and this injection is maintained uniformly during the entire compression stroke of the piston regardless of the increasing compression.

If cooling water is admitted to a cylinder during the suction stroke of its piston a considerable part of the available volume of the cylinder is displaced by the gas liberated from the water which is saturated at the pressure and temperature of the tank. Under normal conditions this water may hold in excess of 16 volumes of $CO_2$ gas in solution and so if 8 cu. in. of injection water is admitted on the suction stroke, the gas dissolved in this water, liberated and expanded to the suction pressure, would occupy about 128 cu. in. of the available volume. A single stage 5" x 8" compressor has a displacement of 160 cu. in. per suction stroke, so if all this gas were liberated, only 32 cu. in. of new gas would be drawn into the cylinder per stroke; also if cooling water is admitted from a constant pressure supply on the compression stroke the amount admitted would decrease as the pressure in the cylinder is built up and a uniform cooling of the gas would be impossible.

It will be apparent from the foregoing explanation that the advantages derived from this system of compression cannot be obtained by apparatus now generally used for this purpose.

By the use of this gas compression apparatus the fine flavors in the gases are not deteriorated by heat but instead, due to avoidance of heating the gases, the flavor of the same is retained at its full value.

We claim as our invention:—

1. A gas compressing apparatus including a compressor having a cylinder provided at each end with a gas inlet and a gas outlet, means for controlling said inlet and outlet, a piston reciprocating in said cylinder and alternately drawing gas through said inlets into opposite ends of said cylinder and discharging the gas alternately through said outlets and compressing the gas during such discharge, and means for injecting cooling water alternately into opposite ends of said cylinder only during each discharge or compression stroke of the piston in the respective ends of the cylinder.

2. A gas compressing apparatus including a compressor having a cylinder provided at each end with a gas inlet and a gas outlet, means for controlling said inlet and outlet, a piston reciprocating in said cylinder and alternately drawing gas through said inlets into opposite ends of said cylinder and discharging the gas alternately through said outlets and compressing the gas during such discharge, and means for injecting cooling water alternately into opposite ends of said cylinder only during the discharge and compression strokes of the piston in the respective ends of the piston, inwardly opening check valves controlling the inlets of said cylinder, and outwardly opening check valves controlling the outlets of said cylinder.

3. A gas compressing apparatus including a compressor cylinder provided at each of its ends with a gas inlet and a gas outlet, an inwardly opening check valve controlling each of said gas inlets, an outwardly opening check valve controlling each of said outlets, a piston reciprocating in said cylinder and adapted when moving in one direction to draw gas into one end of the cylinder through the respective gas inlet and discharge gas from the opposite end of the cylinder through the outlet thereof, and compress the same, and vice versa upon moving the piston in the opposite direction, and water delivery nozzles operating to deliver water alternately into opposite ends of said cylinder only during the discharge and compression of the gas in the respective ends of the cylinder.

4. A gas compressing apparatus including a compressor cylinder provided at each of its ends with a gas inlet and a gas outlet, an inwardly opening check valve controlling each of said gas inlets, an outwardly opening check valve controlling each of said outlets, a piston reciprocating in said cylinder and adapted when moving in one direction to draw gas into one end of the cylinder through the respective gas inlet and discharge gas from the opposite end of the cylinder through the outlet thereof and compress the same, and vice versa upon moving the piston in the opposite direction, water delivery nozzles operating to deliver water alternately into opposite ends of said cylinder only during the discharge and compression of the gas in the respective ends of the cylinder, and a water pump operating to deliver water alternately to said nozzles.

5. A gas compressing apparatus including a compressor cylinder provided at each of its ends with a gas inlet and a gas outlet, an inwardly opening check valve controlling each of said gas inlets, an outwardly opening check valve controlling each of said outlets, a piston reciprocating in said cylinder and adapted when moving in one direction to draw gas into one end of the cylinder through the respective gas inlet and discharge gas from the opposite end of the cylinder through the outlet thereof and compress the same, and vice versa upon moving the piston in the opposite direction, water delivery nozzles operating to deliver water alternately into opposite ends of said cylinder during the discharge and compression of the gas in the respective ends of the cylinder, a water pump having a cylinder arranged axially in line with the compressor cylinder and provided at each end with a water inlet and a water outlet connected with the nozzle at the corresponding end of said compressor cylinder, an inwardly opening check valve controlling each water inlet of said pump cylinder, an outwardly opening check valve controlling each water outlet of said pump cylinder, a plunger reciprocating in said pump cylinder and adapted to alternately draw water into each of said pump cylinders and discharge water therefrom to the respective nozzle, and means for causing said piston and plunger to operate in unison.

6. A gas compressing apparatus including a compressor cylinder provided at each of its ends with a gas inlet and a gas outlet, an inwardly opening check valve controlling each of said gas inlets, an outwardly opening check valve controlling each of said outlets, a piston reciprocating in said cylinder and adapted when moving in one direction to draw gas into one end of the cylinder through the respective gas inlet and discharge gas from the opposite end of the cylinder through the outlet thereof and compress the same, and vice versa upon moving the piston in the opposite direction, water delivery nozzles operating to deliver water alternately into opposite ends of said cylinder during the discharge and compression of the gas in the respective ends of the cylinder, a water pump having a cylinder arranged axially in line with the compressor cylinder and provided at each end with a water inlet and a water outlet connected with the nozzle at the corresponding end of said compressor cylinder, an inwardly opening check valve controlling each water inlet of said pump cylinder, an outwardly opening check valve controlling each water outlet of said pump cylinder, a plunger reciprocating in said pump cylinder and adapted to alternately draw water into each of said pump cylinders and discharge water therefrom to the respective nozzle, and means for causing said piston and plunger to operate in unison, comprising a rod connecting said piston and plunger.

7. A gas compressing apparatus comprising a compressor having a cylinder provided with a gas inlet and a gas outlet at each end means for controlling said inlet and outlet and a piston reciprocating in said cylinder, means for injecting water into each end of said cylinder during the movement of the piston toward the same, a water pump having a cylinder provided at each end with a water inlet and a water outlet connected with one end of said compressor cylinder, a plunger reciprocating in said pump cylinder, and means for automatically relieving excess pressure at opposite ends of said pump cylinder.

8. A gas compressing apparatus comprising a compressor having a cylinder provided with a gas inlet and a gas outlet at each end means for controlling said inlet and outlet and a piston reciprocating in said cylinder, means for injecting water into each end of said cylinder during the movement of the piston toward the same, a water pump having a cylinder provided at each end with a water inlet and a water outlet connected with one end of said compressor cylinder, a plunger reciprocating in said pump cylinder, and means for automatically relieving excess pressure at opposite ends of said pump cylinder, including a relief chamber communicating at opposite ends with opposite ends of said pump cylinder and provided between its ends with a relief port, a relief valve normally closing said relief port and adapted to move in either direction out of operative relation to said relief port, and retaining means for yieldingly holding said relief valve in an operative position in said relief port for normally closing the same but permitting the same to move in either direction out of operative relation to said port for opening the same in response to excess pressure in said pump cylinder.

9. A gas compressing apparatus comprising a compressor having a cylinder provided with a gas inlet and a gas outlet at each end means for controlling said inlet and outlet and a piston reciprocating in said cylinder, means for injecting water into each end of said cylinder during the movement of the piston toward the same, a water pump having a cylinder provided at each end with a water inlet and a water outlet connected with one end of said compressor cylinder, a plunger reciprocating in said pump cylinder, and means for automatically relieving excess pressure at opposite ends of said pump cylinder, including a relief chamber communicating at opposite ends with opposite ends of said pump cylinder and provided between its ends with a relief port, a relief valve normally closing said relief port and adapted to move in either direction out of operative relation to said relief port, and retaining means for yieldingly holding said relief valve in an operative position in said relief port for normally closing the same but permitting the same to move in either direction out of operative relation to said port for opening the same in response to excess pressure in said pump cylinder, said retaining means including valve stems projecting from opposite sides of said relief valve, abutments adjustably mounted in said relief chamber at opposite ends thereof, and a spring mounted on each of said stems between said relief valve and one of said abutments.

10. A gas compressing apparatus comprising a compressor cylinder having an end provided with a gas inlet and a gas and water outlet, check valves controlling said inlet and outlet, a piston reciprocating in said cylinder, a nozzle for delivering water into said compressor cylinder, while the piston therein moves toward said outlet for discharging gas and water therefrom, a separating chamber adapted to contain water in its lower part and gas in its upper part, a casing having a lower water chamber communicating with said nozzle and an upper gas chamber communicating with the upper part of said separating chamber, a diaphragm arranged in said casing and forming a partition between said water chamber and said gas chamber, an injecting valve actuated by said diaphragm and adapted to control the flow of water from said water chamber to said nozzle, and a water pump having a cylinder provided at an end thereof with a water inlet and a water outlet communicating with said water chamber, and a plunger reciprocating in said pump cylinder.

11. A gas compressing apparatus comprising a compressor cylinder having an end provided with a gas inlet and a gas and water outlet, check valves controlling said inlet and outlet, a piston reciprocating in said cylinder, a nozzle for delivering water into said compressor cylinder while the piston therein moves toward said outlet for discharging gas and water therefrom, a separating chamber adapted to contain water in its lower part and gas in its upper part, a casing having a lower water chamber communicating with said nozzle and an upper chamber communicating with the upper part of said separating chamber, a diaphragm arranged in said casing and forming a partition between said water chamber and said gas chamber, an injecting valve actuated by said diaphragm and adapted to control the flow of water from said water chamber to said nozzle, spring means for yieldingly moving said diaphragm in the direction for moving said injecting valve to its closed position, and a water pump having a cylinder provided at an end thereof with a water inlet and a water outlet communicating with said water chamber, and a plunger reciprocating in said pump cylinder.

12. A gas compressing apparatus comprising a compressor cylinder having an end provided with a gas inlet and a gas and water outlet, check valves controlling said inlet and outlet, a piston reciprocating in said cylinder, a nozzle for delivering water into said compressor cylinder while the piston therein moves toward said outlet for discharging gas and water therefrom, a separating chamber adapted to contain water in its lower part and gas in its upper part, a casing having a lower water chamber communicating with said nozzle and an upper chamber communicating with the upper part of said separating chamber, a diaphragm arranged in said casing and forming a partition between said water chamber and said gas chamber, an injecting valve actuated by said diaphragm and adapted to control the flow of water from said water chamber to said nozzle, and a water pump having a cylinder provided at an end thereof with a water inlet and a water outlet communicating with said water chamber, a plunger reciprocating in said pump cylinder and an inwardly opening check valve controlling the inlet of said pump cylinder.

13. A gas compressing apparatus comprising a gas compressor having a compressor cylinder provided at each end with a gas inlet and a gas outlet, check valves controlling said gas inlets and outlets, a piston reciprocating in said compressor cylinder, water inlets communicating with opposite ends of said compressor cylinder, water control chambers communicating respectively with said water inlets, a water pump having a cylinder provided at its opposite ends with check valve inlets and communicating, respectively, with said water control chambers, a plunger arranged in said pump cylinder and operatively connected with said compressor piston, a pressure balancing chamber arranged adjacent to each of said water control chambers, a diaphragm arranged between each water control chamber and the respective pressure balancing chamber, a control valve actuated by each of said diaphragms and controlling the flow of water from the respective water control chamber to the respective water inlet of the compressor cylinder, and a gas and water separating tank adapted to contain water in its lower part and gas in its upper part, and having a gas and water inlet communicating with the outlets of said compressor cylinder, a water outlet communicating with the water inlets of said pump cylinder, and a gas outlet.

14. A gas compressing apparatus comprising a gas compressor having a compressor cylinder provided at each end with a gas inlet and a gas outlet, check valves controlling said gas inlets and outlets, a piston reciprocating in said compressor cylinder, water inlets communicating with opposite ends of said compressor cylinder, water control chambers communicating, respectively, with said water inlets, a water pump having a cylinder provided at its opposite ends with check valve inlets and communicating, respectively, with said water control chambers, a plunger arranged in said pump cylinder and operatively connected with said compressor piston, a pressure balancing chamber arranged adjacent to each of said water control chambers, a diaphragm arranged between each water control chamber and the respective pressure balancing chamber, a control valve actuated by each of said diaphragms and controlling the flow of water from the respective water control chamber to the respective water inlet of the compressor cylinder, a gas and water separating tank adapted to contain water in its lower part and gas in its upper part and having a gas and water inlet communicating with the outlets of said compressor cylinder, a water outlet communicating with the water inlets of said pump cylinder, a gas outlet, and means for cooling the water in said tank.

15. A gas compressing apparatus comprising a compressor cylinder having an end provided with a gas inlet and a gas and water outlet, check valves controlling said inlet and outlet, a piston reciprocating in said cylinder, a nozzle for delivering water into said compressor cylinder while the piston therein moves toward said outlet for discharging gas and water therefrom, a separating chamber adapted to contain water in its lower part and gas in its upper part, a water control chamber communicating with said nozzle, a pressure balancing chamber arranged adjacent to said water control chamber and communicating with with the upper part of said separating chamber, a diaphragm forming a partition between said water control chamber and said pressure balancing chamber, a control valve actuated by said diaphragm and controlling the flow of water from said water control chamber to said nozzle, a water pump having a cylinder an end of which is connected with said water control chamber and also connected by a check valved conduit with the lower part of said separating chamber, a plunger reeciprocating in said pump cylinder and operating to deliver water into said compressor cylinder during the discharge stroke of the piston therein, and a cooling coil arranged in the lower part of said separating chamber and adapted to receive a refrigerating medium.

16. A gas compressing apparatus comprising a compressor cylinder having an end provided with a gas inlet and a gas and water outlet, check valves controlling said inlet and outlet, a piston reciprocating in said cylinder, a nozzle for delivering water into said compressor cylinder while the piston therein moves toward said outlet for discharging gas and water therefrom, a separating chamber adapted to contain water in its lower part and gas in its upper part, a water control chamber communicating with said nozzle, a pressure balancing chamber arranged adjacent to said water control chamber and communicating with the upper part of said separating chamber, a diaphragm forming a partition between said water control chamber and said pressure balancing chamber, a control valve actuated by said diaphragm and controlling the flow of water from said water control chamber to said nozzle, a water pump having a cylinder an end of which is connected with said water control chamber and also connected by a check valved conduit with the lower part of said separating chamber, a plunger reciprocating in said pump cylinder and operating to deliver water into said compressor cylinder during the discharge stroke of the piston therein, a cooling coil arranged in the lower part of said separating chamber and adapted to receive a refrigerating medium, and thermostatic control means responsive to the temperature in said separating chamber for automatically regulating the flow of refrigerant through said cooling coil.

17. A gas compressing apparatus including a compressor having a horizontal cylinder provided at an end thereof with a gas inlet at its bottom and a gas and water outlet at its top, a piston reciprocating in said cylinder, valves controlling said inlet and outlet, and means for injecting water into said cylinder during the compression stroke of said piston toward said inlet and outlet.

18. A gas compressing apparatus including a compressor having a horizontal cylinder provided at each end thereof with a gas inlet in its bottom and a gas and water outlet in its top, a piston reciprocating in said cylinder, inwardly opening check valves controlling said inlets, outwardly opening check valves controlling said outlet, and means for injecting water into each end of the cylinder while the piston therein is effecting a compression stroke toward the outlet in the respective end of the cylinder.

19. A gas compressing apparatus including means for compressing the gas, means for uniformly injecting a cooling liquid into said gas only while same is being compressed in the apparatus, and means for preventing the injection of cooling liquid in said gas while being drawn into the apparatus.

20. A gas compressing apparatus comprising a compressing chamber having a gas inlet and a gas and water outlet, a piston arranged in said chamber, said piston and chamber being movable relatively to each other, an inlet check valve controlling said inlet, an outlet check valve controlling said outlet, a nozzle for delivering water into said compressing chamber, a separating chamber adapted to contain gas and water, a water chamber communicating with said nozzle, a pressure chamber communicating with said separating chamber, a movable member interposed between said water chamber and gas chamber, an injecting valve actuated by said movable member and adapted to control the flow of water from said water chamber to said nozzle, and a water pump adapted to deliver water to said water chamber.

21. A gas compressing apparatus comprising a compressing chamber having a gas inlet and a gas and water outlet, a piston arranged in said chamber, said piston and chamber being movable relatively to each other, an inlet check valve controlling said inlet, an outlet check valve controlling said outlet, a nozzle for delivering water into said compressing chamber, a separating chamber adapted to contain gas and water, a water chamber communicating with said nozzle, a pressure chamber communicating with said separating chamber, an injecting valve controlling the flow of water from said water chamber to said nozzle; and means responsive to the action of said piston for controlling said injecting valve.

EDWARD ZAHM.
GEORGE G. ZAHM.